United States Patent
Rieck

[11] Patent Number: 5,944,296
[45] Date of Patent: Aug. 31, 1999

[54] SUPPORTING FOOT FOR ELECTROACOUSTIC APPARATUS

[76] Inventor: Thomas Rieck, Himmenweide 12, Minden, Germany, 32425

[21] Appl. No.: 08/865,259

[22] Filed: May 29, 1997

[30] Foreign Application Priority Data

May 29, 1996 [DE] Germany ............................ 296 09 490

[51] Int. Cl.⁶ ........................................................ F16M 1/00
[52] U.S. Cl. ............................ 248/638; 248/636; 267/136
[58] Field of Search .................................. 248/636, 562, 248/566, 575, 632, 633, 634, 638, 121, 346.03; 473/534; 267/136, 182, 160; 5/190, 211, 212; 211/119.02, 119.03; 482/27, 28, 29

[56] References Cited

U.S. PATENT DOCUMENTS

| | | | |
|---|---|---|---|
| 25,780 | 10/1859 | Winder | 5/212 |
| 63,500 | 4/1867 | Gillette | 5/212 |
| 2,604,315 | 7/1952 | Patterson | 267/182 |
| 4,765,621 | 8/1988 | Game | 473/534 |
| 5,149,066 | 9/1992 | Snaith et al. | 248/636 X |

FOREIGN PATENT DOCUMENTS

| 88454 | 1/1967 | France | 248/636 |
|---|---|---|---|

*Primary Examiner*—Ramon O. Ramirez
*Assistant Examiner*—Stephen S. Wentsler
*Attorney, Agent, or Firm*—Salter & Michaelson

[57] ABSTRACT

A supporting foot includes a form-stable ring which is applied onto the installation surface, and an elastic cable which is stretched in the ring. The cable is crossed at least once in a central region of the ring so that the apparatus can be installed in a central region of the apparatus foot on the stretched cable. At least one tightening screw is provided for pre-stressing and adjusting the tension of the cable. Deflection pulleys guide the direction of the cable, the pulleys being mounted in rotating manner in the ring. The pulleys define a course that crosses several times upon guiding the cable to the tightening screw.

3 Claims, 1 Drawing Sheet

SUPPORTING FOOT FOR ELECTROACOUSTIC APPARATUS

BACKGROUND AND SUMMARY OF THE INVENTION

The invention concerns a supporting foot for electroacoustic apparatus, such as, e.g., a CD player, for purposes of technical oscillation de-coupling of the device from an installation surface, onto which the apparatus is installed with its apparatus feet.

It will be achieved by the oscillation de-coupling of the device from its installation surface that oscillations and vibrations cannot be transferred either from the device to its installation surface or from the installation surface to the device. The objective is the improvement of the sound of speech and music reproductions of, e.g., CD players or speakers or other electroacoustic apparatus, whose reproduction qualities are disrupted by microphone (sound waves) and/or excitation oscillations from drive motors, transformers, or the like.

Known supporting feet are manufactured in the form of disks placed on the device feet (e.g., pads) of a rubber or plastic material, which has the required damping properties. In addition, conical parking feet (so-called spikes) are known for the purpose of de-coupling in metal-rubber constructions. With all of these known supporting feet, however, the desired sound improvement is possible only to a limited extent, since their de-coupling and/or damping properties cannot be adjusted to the weight and the respective device type.

The object of the invention is to develop supporting feet for electroacoustic apparatus with improved decoupling and/or damping properties.

This object is resolved according to the invention by the fact that the supporting foot has a form-stable ring, which is applied to the installation surface, whereby an elastic cable is stretched inside the ring, and this cable crosses at least once in the central region of the ring, so that the apparatus foot can be installed on the stretched cable in the central region, and that the pre-stress of the cable can be adjusted by means of at least one tightening screw.

A particularly advantageous form of embodiment of the invention is that the cable guide is produced by means of deflection pulleys, which are mounted in a rotatable manner in the ring, and that the cable is guided via the deflection pulleys along a course that crosses several times up to a tightening screw.

The new supporting foot has the advantage that the stretched cable is nearly without mass and can take up and damp vertical and horizontal oscillations without delays due to inertia. The damping values and the carrying force of the stretched cable can be adjusted by the elasticity of the respective cable material as well as particularly by the pre-stress of the cable.

BRIEF DESCRIPTION OF THE DRAWINGS

In the following, an example of embodiment of the invention is described in more detail on the basis of the drawings. Here.

DETAILED DESCRIPTION OF THE INVENTION

The represented supporting foot comprises a form-stable micro-elastic ring 1, e.g., comprised of a plastic, and an elastic cable 2, stretched in the ring, e.g., a nylon cable, which runs over deflection pulleys 3 along a guide path that crosses several times up to a tightening screw 4.

Figure 1:
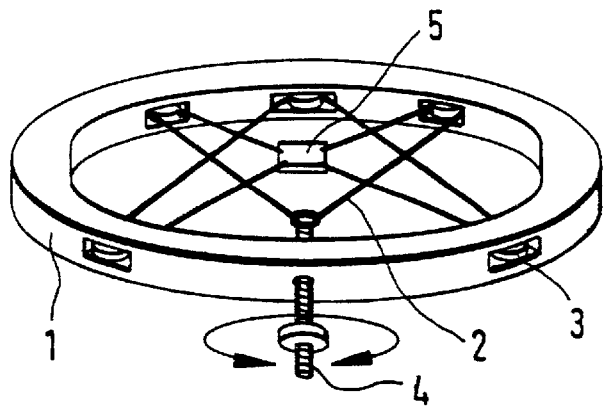
FIG. 1 shows a supporting foot according to the invention in a perspective view.
Figure 2:
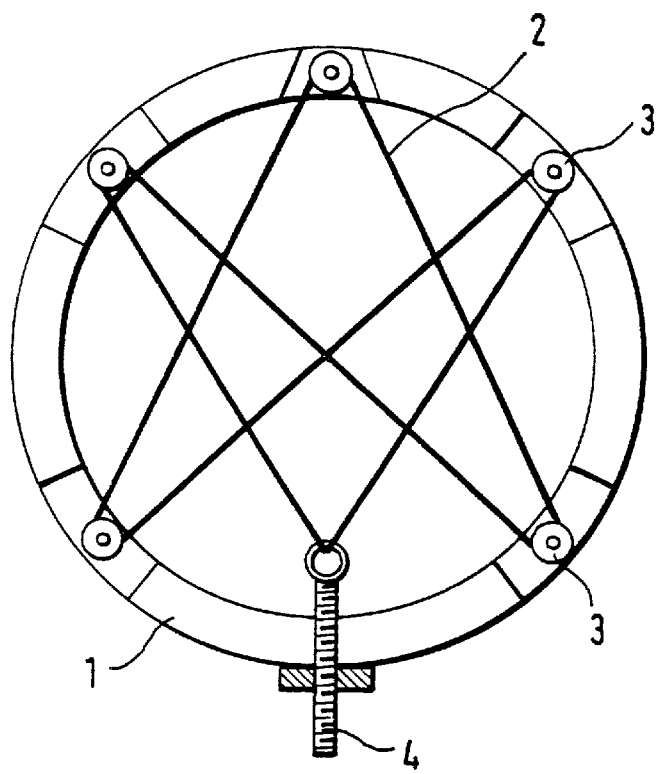
FIG. 2 shows a top view onto the supporting foot according to FIG. 1.

The cable crosses in the central region and there a support platform 5 (see FIG. 1) is attached to the cable and the apparatus can be installed on this platform. This support platform is not shown in FIG. 2, so that the crossing points of the cable in the central region can be clearly seen.

Figure 3:
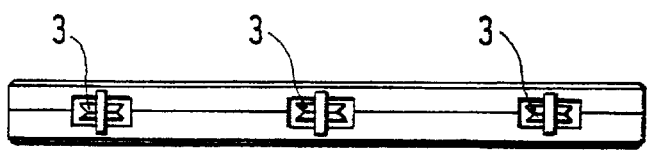
FIG. 3 shows the front view onto the foot according to FIG. 1.

The represented example of embodiment is specific for a CD player. Cable 2 has a carrying force of approximately 5 kg. The ring that is 2 cm in height and approximately 10 cm in diameter comprises deflection pulleys 3 mounted in a rotating manner on vertical axes (see FIG. 3). Tightening screw 4, which is supported on the outer periphery of ring 1 by means of a nut, serves for adjusting the de-coupling and damping properties of the represented parking foot that are desired each time.

The optimal adjustment of the supporting foot can be produced in a measured manner, but it is also possible to adjust it by eye.

What is claimed is:

1. A supporting foot for oscillation de-coupling of an electroacoustic apparatus from an installation surface onto which the apparatus is to be installed in order to impede transmission of vibration forces between the apparatus and the installation surface, the supporting foot comprising:

a dimensionally stable ring constructed and arranged to be applied onto the installation surface, the ring including an outer perimeter and an inner perimeter, the inner perimeter circumscribing a void;

a resilient cable supported by and stretched within the ring, the cable being disposed along a guide path that is constructed and arranged so that the cable crosses itself at least once in a central region of the void, wherein the electroacoustic apparatus is supportable in the central region of the supporting foot on the cable so as to impede the transmission of vibration forces between the apparatus and the installation surface;

at least one tightening screw for pre-stressing and adjusting tension of the cable; and a bearing platform supported on the cable in the central region and constructed and arranged to support the electroacoustic apparatus thereon.

2. The supporting foot as set forth in claim 1 further comprising a plurality of deflection pulleys for guiding the direction of the cable along the guide path, each pulley being mounted in a rotating manner in the ring about a vertical axes.

3. The supporting foot as set forth in claim 1, wherein the deflection pulleys are disposed along the ring so that the cable crosses itself more than once within the void.

* * * * *